F. G. DU PONT.
PROCESS OF AND APPARATUS FOR MAKING SMOKELESS POWDER.
No. 11,651. Reissued Feb. 15, 1898.
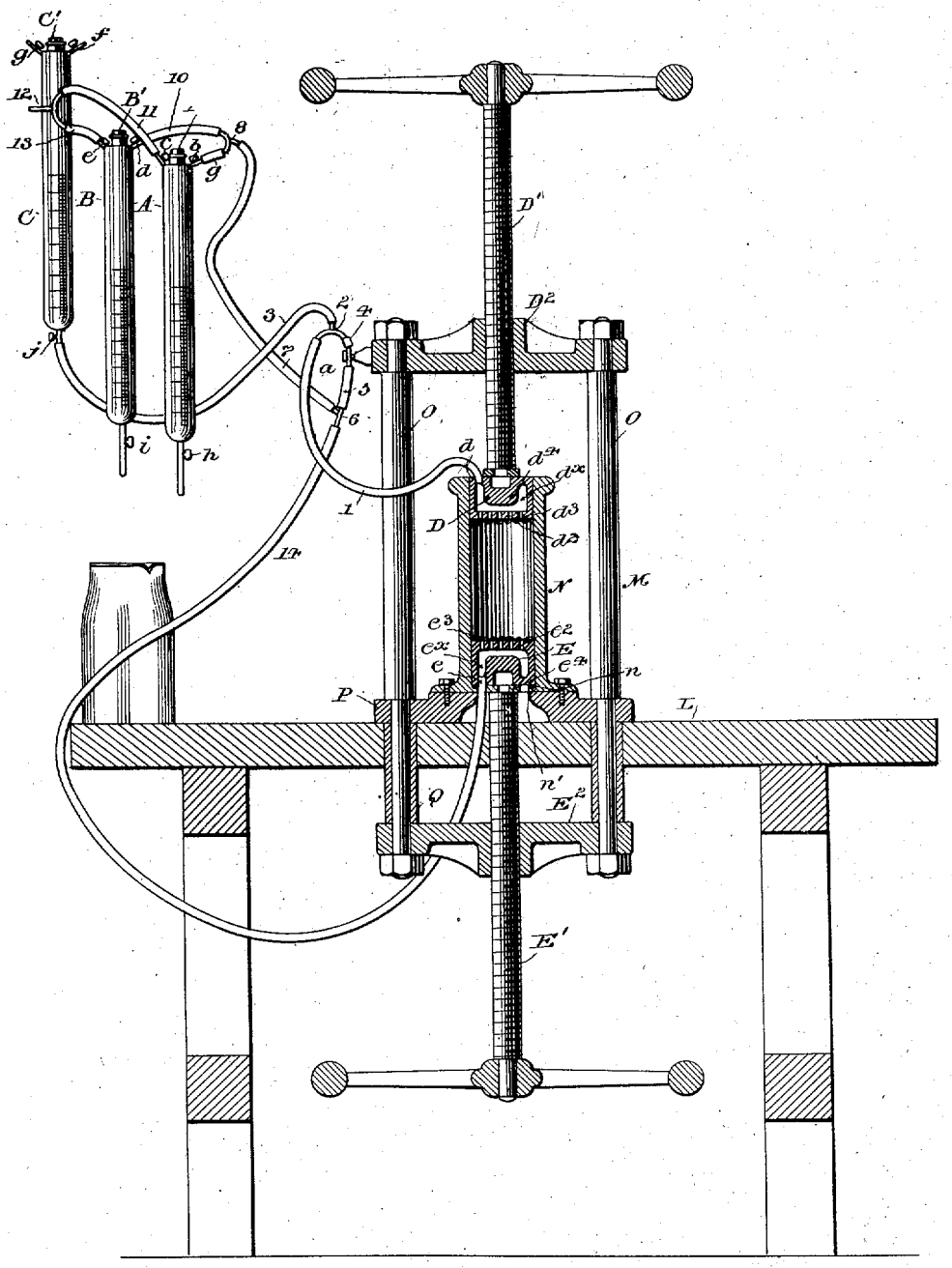
WITNESSES:
Arthur Ashley
N. Wettling.
INVENTOR
Francis G. DuPont
BY E. M. Wade & Son
ATTORNEYS

UNITED STATES PATENT OFFICE.

FRANCIS G. DU PONT, OF WILMINGTON, DELAWARE.

PROCESS OF AND APPARATUS FOR MAKING SMOKELESS POWDER.

SPECIFICATION forming part of Reissued Letters Patent No. 11,651, dated February 15, 1898.

Original No. 590,931, dated September 28, 1897. Application for reissue filed December 28, 1897. Serial No. 664,136.

*To all whom it may concern:*

Be it known that I, FRANCIS G. DU PONT, of Wilmington, in the county of New Castle and State of Delaware, have invented certain new and useful Improvements in Processes of and Apparatus for Making Smokeless Powders; and I do hereby declare the following to be a full, clear, and exact description of the invention, that will enable others skilled in the art to which it appertains to make and use the same, reference being had to the accompanying drawing, and to the letters and figures of reference marked thereon, which forms a part of this specification.

My invention relates to improvements in processes for treating guncotton in the manufacture of explosives and in other arts; and it consists in the novel process for treating guncotton, in the apparatus used in connection therewith, and in an improved process for manufacturing smokeless powder, of which the process for treating guncotton forms a part, all of which will be hereinafter fully described, and particularly pointed out in the claims.

Guncotton is used in many arts and in a variety of ways. It is rarely, if ever, however, used in its original form, as it requires treatment by various chemicals to impart to it the qualities which render it valuable. In most if not all of the processes to which guncotton is subjected it has been heretofore deemed necessary, as an initial step, to thoroughly dry the guncotton, as water acts to dilute the chemicals used and to prevent them from exercising their proper action upon the guncotton.

Aside from the cost entailed by the necessity of carefully drying the guncotton there are serious disadvantages to any process which necessitates the use of dry guncotton, for dry guncotton is very dangerous, and by reason of its impalpable nature cannot be so closely confined as to prevent it from floating around the room in which it is kept. It cannot be decanted from one vessel to another without forming a cloud of dust, and while, if proper precautions are observed, no danger can result from the handling of dry guncotton, still there is certain to be an accident sooner or later in any establishment using it.

The process which I have devised removes all danger from processes in which dry guncotton has heretofore been employed, and especially from the manufacture of smokeless powder, by rendering it possible to keep the guncotton at all stages in its treatment in a wet condition, when it is absolutely harmless. I dispense entirely with the drying of guncotton, and instead treat wet guncotton in such a manner that all the water may be removed therefrom and supplanted by any chemical not a solvent of guncotton to be used in the process to which the guncotton is to be subjected. Thus in the manufacture of smokeless powder, in which alcohol and ether are to be mixed with the guncotton, I displace the water in the wet guncotton with alcohol without at any stage in the displacement drying the guncotton, and afterward mix the ether into the alcoholized guncotton. In this case an especial advantage is obtained by reason of the affinity which ether has for alcohol, for the ether penetrates the mass of alcoholized guncotton much more readily and uniformly than do alcohol and ether, when mixed together, dry guncotton. Not only is the process of mixing the ether into the alcoholized guncotton much easier to accomplish, but the resultant explosive is more satisfactory and is more even and uniform in its qualities. Furthermore, I accomplish the displacement of water by alcohol in the process above described, and in general terms the displacement of the liquid with which the guncotton is saturated by the other liquid with which it is desired to saturate the guncotton without appreciable admixture of the two, so that my process is economical and can be carried on with great certainty by a knowledge of the amount of guncotton under treatment.

It has long been known that the displacement of liquids could be accomplished without admixture thereof in certain classes of powders in which moisture does not cause the powders to form lumps, in certain classes of drugs, and—a more familiar example—in sand. This process of displacement of liquids or "percolation," as it is called, has been thoroughly understood for a number of years and the character of its operation and the conditions necessary to be fulfilled in order that its operation may be possible have been fully observed. I have discovered, however, that if wet guncotton be compressed, the water or other non-solvent liquid with which it may be saturated being carried away as rapidly as it exudes from the guncotton, the guncotton will be reduced to a state of equal porosity throughout its mass. The water or other non-solvent liquid can then be displaced by the ordinary process of percolation by a liquid, such as alcohol, which is not a solvent of guncotton. The displacement will take place, irrespective of the miscibility of the liquids, and all of the water or other non-solvent liquid with which the guncotton may at first be saturated will be removed therefrom without appreciable admixture with the liquid which is displacing it. The admixture which does take place is confined entirely to the head of the piston-like column of displacing liquid, so that it can be allowed for in advance and dilution of the body of displacing liquid following avoided. The exact degree of compression to which the guncotton is subjected in order that percolation may successfully take place may be varied within certain limits without affecting the successful operation of the process; but care must be taken not to compress the guncotton to too great an extent, for a point is reached in the compression of guncotton where the process of displacement cannot be successfully carried on by reason of the density of the guncotton. Compression must, however, always be exerted in order to bring the guncotton to a condition of equal porosity, and this compression will be in excess of that which can be effected by the weight of the atmosphere alone when air is withdrawn from the chamber containing the guncotton.

The apparatus which I have devised in order to carry out my process, in so far as it relates to the displacement of liquids in guncotton, is represented in the drawing which accompanies and forms a part of this specification, which is an elevation, partly in section, of my press.

As a means for producing the desired compression of the guncotton to be treated I have found it convenient to use a press which is constructed so as to permit air to be withdrawn from the compression-chamber. The compression can thus be effected in two easy stages—first, that due to the pressure of the atmosphere as the air is gradually withdrawn from the compression-chamber, and, second, that due to the additional pressure occasioned by the manipulation of the press. The liquid which is expressed from the guncotton during the compression thereof I collect in glass vessels, which are arranged beside the press and connected therewith and which are finely graduated, so as to enable the operation of the process to be followed with exactness.

I shall first describe my press, then the glass measuring vessels and their connections, and finally the operation of my process as an entirety.

*Press.*—Referring to the drawing, L represents a table which forms a base or support for the press M. The press M consists of a cylinder of brass or other suitable material, which is provided with two head-blocks or ends D and E, both of which are regulated as to their position by the action of screws D′ and E′, respectively. The screws D′ and E′ work through bearing-plates $D^2$ and $E^2$, respectively, which are supported and held in position by the brackets O. In the construction shown the brackets O extend downward through the base-plate P, to which the cylinder M is directly bolted, and through the table, and have attached thereto the lower bearing-plate $E^2$, as well as the upper bearing-plate $D^2$. The brackets O are shouldered or reduced in diameter at the point where they pass through the base-plate P, and collars Q are placed around the portions of the brackets between the lower plate $E^2$ and the base-plate P. This construction is advantageous because it combines simplicity with strength. The chief feature of my invention, however, consists in the pressure-blocks D and E, which fit air-tight within the cylinder of the press. The interior of these blocks is hollowed out to form chambers $d^\times$ and $e^\times$, which are in connection with the outside of the press through openings $d'$ and $e'$, formed on the outer face of the same, and are in connection with the interior of the press by series of perforations $d^2$ and $e^2$, formed on their inner faces. Over the inner face of the blocks I stretch wire-cloth of fine mesh $d^3$ and $e^3$, the purpose of which will hereinafter appear. It is intended that the pressure-block D may be removed from the press, and when removed be entirely separate from the screw D′, so that the only connection between the two is a recessed portion $d^4$ in the outer face of the block, within which the end of the screw D′ plays. The lower pressure-block E is, however, not to be removed from the press, and, as it is to be moved in both directions by the screw E′, is connected therewith in any suitable manner—as, in the instance shown, by the ring $e^4$, which is attached to the under surface of the pressure-block and fits around a portion of the screw E′ of less diameter than the end which enters the recessed portion $e^5$ of the pressure-block. In order to insure the pressure-block E resting tightly against the lower end of the cylinder when drawn down to its lowest limit, I use a strip of packing $n$, which is placed upon the inner peripheral flange $n'$, which serves to limit the downward movement of the pressure-block E.

*Glass measuring vessels.*—The glass measuring vessels which I use in connection with my press to collect the liquid which is expressed from the mass of guncotton are represented in the drawing by the reference characters A and B. In the glass vessel C is contained the alcohol which is to displace the water in the guncotton when the guncotton has been compressed sufficiently to enable the process of percolation to be successfully carried out. All of the glass vessels are finely graduated, so that their contents can be determined with exactness at any time. The operation of the process can thus be followed and the various stages to which it is carried noted by reference to the volumes of liquid in the various vessels. Each vessel is provided with an opening in its top, through which it may be filled, closed by corks A′, B′, and C′, respectively, discharge-openings closed by cocks *h*, *i*, and *j*, respectively, and two openings in its upper end closed by cocks *b* and *c*, *d* and *e*, *f* and *g*, respectively.

The connections between the glass vessels and the cylinder of the press are as follows: From the opening *d′* in the upper pressure-block D leads a tube 1, which extends to the glass connection 2. From the glass connection 2 extends a tube 3, leading to the discharge-outlet of the glass vessel C, and the short tube 4, which leads to the cock *a*. From the other end of the cock *a* extends a tube 5, which leads to the glass connection 6, from which extends a tube 7, leading to the glass connection 8, and the tube 14, leading to the opening *e′* in the lower pressure-block E. From the glass connection 8 extend two tubes 9 and 10, respectively, which lead to the cocks *b* and *d*, respectively, of the measuring vessels A and B. From the cocks *c* and *e*, respectively, of the measuring vessels A and B extend tubes 11 and 13, which lead to a common glass connection 12. The glass connection 12 is connected to an air-pump (not shown) in any suitable manner.

If the connections be traced, it will be seen that by proper adjustment of the cocks air can be withdrawn from one or both ends of the cylinder-chamber and the liquid expressed from the guncotton may be collected within either of the measuring vessels A and B. It will also be seen that the measuring vessel C can be connected with the upper pressure-block D at the same time that liquid is being withdrawn through the lower pressure-block E.

*Operation of process.*—In the operation of my process the pressure-block D is removed from the press and the pressure-block E lowered to its extreme limit, so that the compression-chamber is ready to receive the mixture of guncotton and water, which is then poured therein. In the treatment of guncotton for the manufacture of smokeless power the amount of alcohol to be introduced into a given weight of guncotton is fixed and determined by the character of the explosive which it is desired to produce. It is convenient, therefore, to know the exact amount of guncotton contained in the mixture placed within the cylinder of the press, so that I prefer to draw the mixture from a large vessel in which a known quantity of guncotton is held suspended in water by the action of a mechanical agitator, so that any specimen of liquid withdrawn therefrom will represent the entire mixture and will contain a weight of guncotton determined by the amount of the mixture withdrawn. The cocks *a*, *d*, *e*, *h*, *i*, and *j* are then closed and the vacuum-pump connected with the glass connection 12 put in operation. The water contained in the mixture of guncotton will be withdrawn by the suction resulting from the action of the vacuum-pump and will be collected within the measuring vessel A. When the withdrawal of liquid in this manner has been carried as far as practicable, the pressure-block D is lowered into the cylinder and the cock *a* opened, so that a vacuum will be applied at both ends of the cylinder of the press. Should the measuring vessel A become filled with liquid, cocks *b* and *c* may be closed and cocks *d* and *e* opened, so that the liquid discharged will be collected within the measuring vessel B. The measuring vessel A may then be emptied by withdrawing the cork A′ and opening the cock *h* in readiness to have the flow of liquid diverted into it in a later stage of the process. When the compression produced by the vacuum has been carried as far as is practicable, the screw D′ may be lowered and the pressure-block D forced downward until the guncotton is compressed to a sufficient degree to permit the process of percolation to be satisfactorily carried out. I have found that a pressure of one hundred and fifty to two hundred pounds to the square inch is sufficient to make the guncotton equally porous throughout, which is the condition under which it must be held when in the next step of the process alcohol is introduced to percolate downward through the mass and drive off the water before it.

The alcohol which is to displace the water in the guncotton is contained within the glass vessel C. As a convenient means for enabling the operation of the process to be watched with greater certainty than would otherwise be the case, I have found it convenient to color the alcohol, and have used for this purpose a dye called "cudbear," though almost any dye can be used. The air-pump still working, cock *a* is closed and cock *j* opened. The conditions are now such that the colored alcohol contained in the vessel C passes down the tube leading from the lower cock of C and finds its way to the interior of the block D, and from thence, by the perforations in the block and the wire-gauze before mentioned, to the cake of guncotton contained in the cylinder. A very perfect displacement now occurs, the water being drawn off by the vacuum applied and collected in the vessel A, cocks *d* and *e* being closed and cocks *b* and *c* opened for this purpose. The water flows uninterruptedly into the vessel A until it has been entirely removed from the cake of guncotton, when the color of the alcohol appears in the glass connection 6 below the cock *a*. This alcohol will be in a diluted condition both because of the water contained in the tube 14 and because in the displacement of water in the mass of guncotton by alcohol the line of demarcation between the alcohol and the water as the former passes down through the cake, while sharp and well defined, is frequently tipped to the horizontal line to a greater or less extent. This causes the alcohol to go out on one side of the bottom of the cake a little in advance of the other, thus causing more admixture than would otherwise occur. When the color of the alcohol appears at the connection 6 of the tubes, the cocks are changed. *b* and *c* are closed and *d* and *e* opened, thus allowing the collection of the weak alcohol in the vessel B, which has previously been emptied of its contents. When a small amount of the weak alcohol is collected in the vessel B, the color of the liquid in the glass connections will be found to have deepened, and the appearance will be that of the original colored alcohol contained in C. When matters have progressed thus far, the cocks are again changed. *d* and *e* are closed, while *b* and *c* are opened, the vessel A having been emptied of its contents in preparation for this operation. The supply of alcohol from the glass vessel C is now shut off by means of the cock *j*, the cock *a* is opened, and pressure is applied by means of the upper screw D′. The vacuum now being applied to the upper and lower blocks of the press simultaneously, the alcohol that is squeezed out by the pressure is collected in the measuring vessel A. The compression upon the cake of guncotton in the press is now only limited by the amount of the alcohol that it is desired to leave in the cake. The alcohol which is expressed will be found to be of the same strength as the original alcohol contained in the vessel C, and, having suffered nothing by the displacement, may be used again for another pressing.

In a particular instance when I used a mixture of guncotton in water in which one hundred and seventy-five grams of guncotton were suspended in two liters of the mixture employed after compressing the mixture and removing the surplus water therefrom and then displacing the water contained in the guncotton by alcohol I found in the neighborhood of two hundred and twenty cubic centimeters of the alcohol present in the guncotton. As I desired to have left only seventy cubic centimeters of alcohol in the cake, one hundred and fifty cubic centimeters of the alcohol were expressed and collected in the measuring vessel A, from thence being transferred to the vessel C. The amount of weak alcohol collected in the measuring vessel B in this instance amounted to forty cubic centimeters, an inappreciable amount as compared with the amount of guncotton treated. This is an average illustration of the working of my press.

When the pressing is completed, the top block D is removed from the press and the bottom block E′ raised by its screw, the cake of guncotton being elevated out of the top of the cylinder. The block is then found to be in just the condition required for the admixture of the ether for making an alcohol-ether smokeless powder. The cake, though hard, is friable and readily yields to the crushing action of the usual methods employed. The addition of the required quantity of ether is rendered more easy to effect on account of the affinity which ether possesses for alcohol, as the ether finds its way readily along the lines of the substance already wet with the alcohol. The pressure being applied while the alcohol is in the cake seems to result in a much more intimate mixture than is possible with the old methods. The product obtained by this process is much more uniform than that obtained in any other manner with which I am acquainted.

While I have described my process for displacing liquids in guncotton as constituting a step in the manufacture of smokeless powder, it is apparent that this process can be used in many arts—in fact, in any art in which one of the liquids with which dry guncotton has heretofore been treated is not a solvent of guncotton and can thus serve to displace water in wet guncotton. I do not limit myself, therefore, to the use of my process for displacing liquids in guncotton to the manufacture of smokeless powder, but may use it in any other art for which it is adapted.

It is also evident that instead of using an air-pump to effect the removal of the surplus water from the guncotton and to assist the entrance of alcohol into the compressed cake of guncotton other means can be employed, as this is only one of many convenient methods of obtaining the required pressure.

It is also evident that the use of the measuring vessels which I have described may be varied or entirely dispensed with when a known quantity of guncotton is being treated, so that they do not form an essential part of the working of my process or of the apparatus which I use.

I do not herein claim, broadly, the displacement of the water remaining in wet guncotton by a liquid not a solvent of guncotton through the action of the process of percolation, nor do I claim, broadly, a cylinder having pressure-blocks at each end thereof formed with passages for permitting the removal of liquids therethrough; but

What I claim as new, and desire to secure by Letters Patent, is—

1. The herein-described process of displacing liquids in guncotton, which consists in compressing wet guncotton until it has reached a condition of equal porosity throughout and displacing by percolation with pressure the water remaining in the guncotton by a liquid not a solvent of guncotton, such as ethyl alcohol, the guncotton being held under pressure during the percolation process, substantially as described.

2. The herein-described process of manufacturing smokeless powder, which consists in displacing the water in wet guncotton with alcohol by percolation with pressure, compressing the guncotton until only the quantity of alcohol desired to combine with the colloidizing solvent remains, and mixing with the alcoholized guncotton a solvent, such as ether, used in colloidizing the guncotton, substantially as described.

3. The herein-described process of manufacturing smokeless powder, which consists in displacing the water in wet guncotton with alcohol by percolation with pressure, compressing the guncotton until only the quantity of alcohol desired to combine with the colloidizing solvent remains, and mixing with the alcoholized guncotton a solvent which, with the alcohol, will colloidize the guncotton, substantially as described.

4. The herein-described process of manufacturing smokeless powder, which consists in displacing the water in wet guncotton with alcohol by percolation with pressure, compressing the guncotton until only the quantity of alcohol desired to combine with the colloidizing solvent remains and mixing ether with the alcoholized guncotton, substantially as described.

5. The herein-described process of manufacturing smokeless powder, which consists in compressing wet guncotton until it has reached a condition of equal porosity throughout, displacing by percolation with pressure the liquid in the guncotton by alcohol, compressing the guncotton until only the desired quantity of alcohol remains therein, and mixing sufficient ether with the alcoholized guncotton to gelatinize the mass, substantially as described.

6. In a press, the combination with a cylinder, of movable pressure-blocks constituting the ends of said cylinder, said blocks being formed to permit the passage of liquids therethrough, one of said blocks being removable from the cylinder and the other of said blocks being capable of reciprocation within said cylinder, thereby providing for the discharge from said cylinder of the condensed cakes of explosive, an air-exhaust conduit, and connection between said pressure-blocks and said exhaust-conduit, substantially as described.

7. In a press, the combination with a cylinder, of movable pressure-blocks forming the ends of said cylinder, said pressure-blocks being interiorly chambered, having perforations leading from said chambered portions to the inner faces thereof, and passages leading from said chambered portions to the outer faces thereof, one of said pressure-blocks being removable, screws for operating said blocks, an air-exhaust conduit, and connection between said pressure-blocks and said exhaust-conduit, substantially as described.

In testimony whereof I affix my signature in presence of two witnesses.

FRANCIS G. DU PONT.

Witnesses:

A. D. LECARPENTIER,

FRANK E. HALEY.